United States Patent [19]
Movick

[11] 4,171,721
[45] Oct. 23, 1979

[54] REFRIGERATION APPARATUS

[76] Inventor: Nyle O. Movick, 4600 Macky Way, Boulder, Colo. 80302

[21] Appl. No.: 850,630

[22] Filed: Nov. 11, 1977

[51] Int. Cl.² .............................................. F28D 15/00
[52] U.S. Cl. ...................................... 165/45; 165/105; 62/260
[58] Field of Search .......................... 165/45, 105, 106; 62/260, 333

[56] References Cited

U.S. PATENT DOCUMENTS

| | | | |
|---|---|---|---|
| 2,203,023 | 6/1940 | Kuenzli | 62/333 X |
| 2,242,926 | 5/1941 | Shipman | 62/333 X |
| 2,461,449 | 2/1949 | Smith et al. | 62/260 |
| 2,499,736 | 3/1950 | Kleen | 165/105 X |
| 3,951,204 | 4/1976 | Movick | 165/106 |

*Primary Examiner*—Albert W. Davis, Jr.
*Attorney, Agent, or Firm*—Stephen A. Gratton

[57] ABSTRACT

Refrigeration apparatus for transferring heat from a space to be cooled to a cooler medium. A refrigerant is circulated from the space to be cooled to the cooler medium picking up heat from the space and transferring it to the cooler medium. Thermal pump apparatus is utilized to circulate the refrigerant with no energy input other than the heat input from the space to be cooled.

5 Claims, 1 Drawing Figure

REFRIGERATION APPARATUS

BACKGROUND AND SUMMARY OF THE INVENTION

The present invention relates to refrigeration apparatus and more particularly to apparatus for cooling the air in a building or the like.

The term refrigeration implies the creation of a temperature in a given space lower than the temperature in some other, or adjacent space. In air conditioning for instance, refrigeration or cooling of a space is required when the environmental condition are such that heat must be removed from the air to provide a comfortable temperature for the occupants of the space. Most prior art air conditioning apparatus utilize the vapor compression method of refrigeration in which a refrigerant absorbs the heat in the air at the relatively low temperature of the air and is vaporized, and then by the action of mechanical work through compression, is raised to a sufficiently high temperature to allow rejection of this heat during condensation of the vapor back to a liquid. A compressor is utilized to raise the temperature of the refrigerant and to establish a pressure differential for moving the refrigerant through the system. Refrigeration systems of this nature are relatively expensive to operate because of the energy required to drive the compressor. In addition, additional energy is usually required to circulate air or some other fluid around the condensor of the system for condensing the refrigerant which has been vaporized, back to a liquid. Also complicated controls, such as expansion valves, compressor valves, and float valves, are required to control the flow of the refrigerant through the system.

Other types of refrigeration systems such as the absorption type and the steam jet type do not utilize a compressor but depend on additional heat input into the system to change the condition of the refrigerant required in the refrigeration cycle, and to circulate the refrigerant through the system. These types of refrigeration systems because of their energy requirements are also relatively expensive to operate and also require complicated controls.

The present invention does not utilize a refrigeration cycle in which energy is added to a refrigerant to allow rejection of absorbed heat, rather the invention provides apparatus for moving heat from a warm medium such as the air in a room, to a cooler medium such as subterranean water without the use of additional energy input, and with a minimum number of controls and valves. The invention can be used to provide refrigeration whenever a temperature difference exists between a space to be cooled and a medium which is capable of absorbing the transferred heat. The invention can be used in most refrigeration applications and is particularly suitable for use in air conditioning applications where the heat in the warm air of a building can be transferred to cool subterranean water or to the building's domestic water supply.

The refrigeration system of the invention then generally comprises means for collecting heat from the material and space that is being refrigerated, and means for transferring this heat to a cooler medium. More particularly the invention comprises; evaporator means adapted to contain a refrigerant for collecting heat from the space to be cooled for transforming part of the refrigerant from a liquid to a vapor; pump means for circulating the warmed refrigerant to a medium cooler than the space to be cooled and then back through the evaporator means; and heat exchanger means for transferring heat from the heated refrigerant to the cooling medium.

The pump means of the invention is thermal pump apparatus of the type disclosed in my prior U.S. Pat. No. 3,951,204 for thermally circulating a liquid, and is capable of circulating the refrigerant through the system with no energy input other than the heat energy transferred by the room to be cooled to the refrigerant.

DETAILED DESCRIPTION OF THE INVENTION

Figure 1:
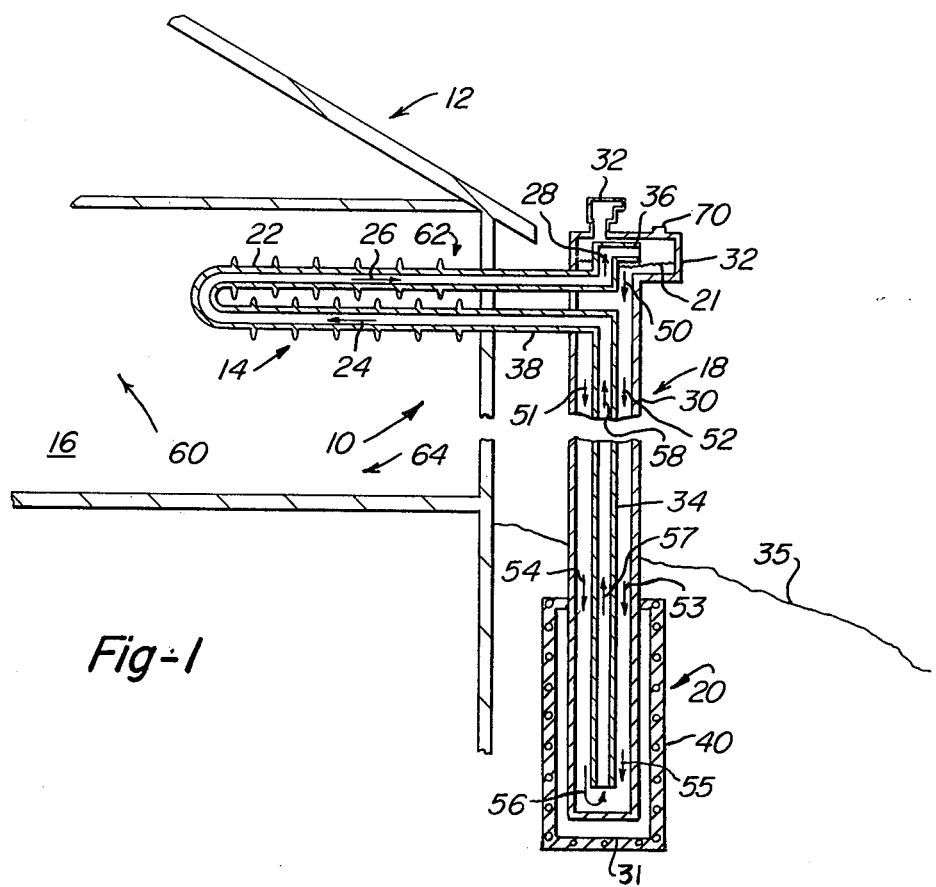
FIG. 1 is a diagrammatic side elevation view of a refrigeration system utilizing the invention.

An illustrative embodiment of the new and improved refrigeration system generally designated by numeral 10 is shown in FIG. 1 for air conditioning a building 12. The refrigeration system 10 generally comprises: evaporator means in the form of a finned tubing evaporator 14 adapted to contain a refrigerant for collecting heat from the room to be cooled 16 for warming the refrigerant and transforming part of the refrigerant from a liquid to a vapor; pump means in the form of thermal pump apparatus 18 for circulating the refrigerant through the system; and heat exchanger means in the form of a perforated casement heat exchanger 20 adapted to circulate groundwater around the lower end of the thermal pump apparatus 18 for cooling the heated refrigerant.

Refrigerant

The refrigerant can be any stable, noncorrosive, nontoxic, substance having a suitable liquid-vapor phase to serve satisfactorily in the temperature range required. In the illustrative embodiment for providing air conditioning the system can be charged with a refrigerant that will boil at approximately the desired room temperature. Thus if a refrigerant is injected into the system at a pressure such that boiling will occur in the 70°-75° F. range then the system will remove heat from the air whenever the temperature in the room is above 70°-75° F. and will not operate if the temperature is below 70°-75° F. As will be explained, under these conditions no thermostatic controls are required because the system will automatically operate to contain the room at the desired temperature.

The refrigerant may be injected into the system 10 at the pressure required to obtain the desired boiling temperature. Line 21 indicates the approximate cold liquid fill level for the refrigerant.

Evaporator

The evaporator 14 comprises metal fin tubing 22 routed through the room to be cooled 16. The fin tubing 22 is preferably located near the ceiling of the room 16 such that the warmest air in the room is encountered. The length and size of the fin tubing 22 will depend on the cooling load of the room 16.

The liquid refrigerant is circulated through the fin tubing 22 as indicated by arrows 24 and 26 picking up heat from the air in the room 16 through the metal of the tubing 22. The finned tubing 22 provides a large surface area for transfer of heat to the refrigerant.

The heat which passes into the refrigerant in the evaporator 14 is absorbed by the refrigerant raising its temperature and changing some of the refrigerant from a liquid to a vapor. The evaporator 22 is sized such that not all of the refrigerant however, passes into the vapor state. Preferably most of the refrigerant remains in the liquid state and the heated liquid refrigerant along with the vapor flows upward as indicated by arrow 28 from the evaporator to the thermal pump apparatus 18.

The thermal syphon produced by the refrigerant which has been heated displacing the incoming cooled refrigerant causes the hot refrigerant and vapor to flow upwardly from the evaporator 14 to the thermal pump 18.

Thermal Pump Apparatus

Thermal pump apparatus 18 provides means for pumping the refrigerant from the level of the evaporator 14 to a lower level for cooling and after cooling back through the evaporator.

The thermal pump apparatus 18 generally comprises a first relatively large diameter standpipe 30, having a closed bottom portion 31 and pressure relief valve 33 mounted at a closed top portion, an expansion chamber 32 in communication with standpipe 30 at one end and closed at the other end, and a second standpipe 34 in thermal conductive relationship with the first standpipe 30, routed through and out of the first standpipe 30 and in communication with the first standpipe 30 at its lower end 31.

The upper end 36 of the evaporator 14 is routed through standpipe 30 and terminates at the expansion chamber 32 in communication with the interior of the expansion chamber. The lower end 38 of the evaporator 14 is in communication with the second standpipe 34. The thermal pump 18 is located outside of the building in an approximately vertical position and extends from a level above the evaporator 14 down to the water table which may be some distance below ground level 35. All surfaces of the thermal pump in contact with the air must be insulated with suitable insulation (not shown).

The evaporator 14 and thermal pump 18 comprise a closed system for circulating the refrigerant from the evaporator for heating to the water table for cooling as will hereinafter be described.

Heat Exchanger

The heat exchanger 20 is used to transfer heat from the hot refrigerant to a cooling medium for cooling the refrigerant. In the illustrative embodiment the heat exchanger 20 comprises a perforated casement 40 that encloses the bottom portions of standpipes 30 and 34. The casement 30 is submerged in the water table and allows cool groundwater to circulate around standpipe 30 for cooling the heated refrigerant which circulates within the standpipe.

Figure 2:
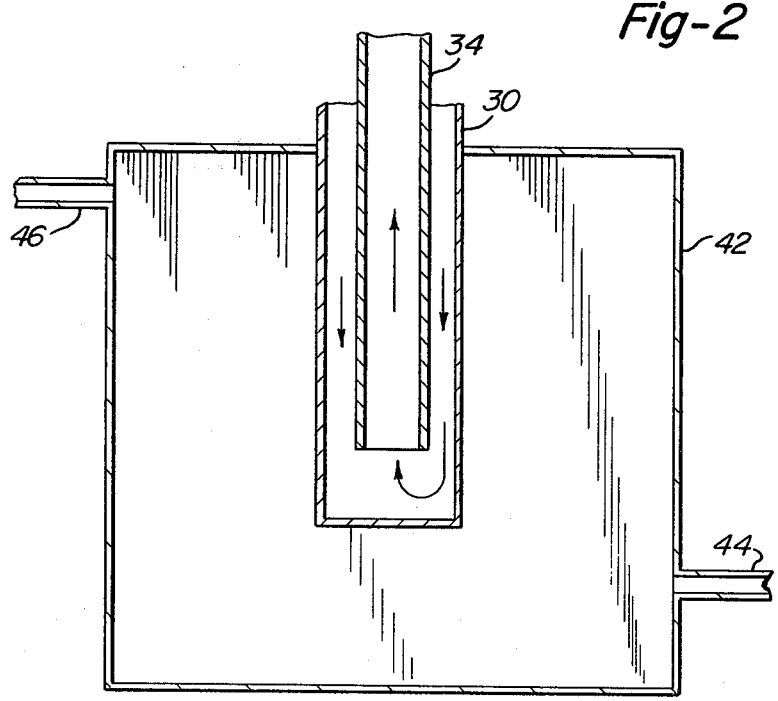
FIG. 2 is a diagrammatic side elevation view of an alternate heat exchanger for the system illustrated in FIG. 1.

Since the groundwater will be at a temperature approximately between 45° F. and 55° F. a temperature differential of approximately 20° is provided for cooling the heated refrigerant which will be in the 70° F.–75° F. range. This type of heat exchanger is practical in areas where the water tables are high. If the building 12 is located above a low water table an alternate heat exchanger as illustrated in FIG. 2 may be used. The heat exchanger shown in FIG. 2 comprises a pressurized vessel 42 which encloses the lower portion of the standpipes 30 and 34. At the lower end of the vessel 42 is a supply pipe 44 which is connected to the water main (not shown) for the building 12. Cool water from the water main is circulated through pipe 44 into the pressure vessel 42 for picking up heat from the heated refrigerant (70° F.–75° F.) moving in the standpipes 30 and 34. The temperature of the water from the main will usually be in the range of 45°–60° F. and thus a temperature differential of approximately 20° is provided for cooling the heated refrigerant.

After circulating through the pressure vessel 42 the heated water exits through pipe 46 which is located near the upper end of vessel 42. This heated water may then be piped to the hot water heater (not shown) of the building 12 for more heating. The water pressure in the water main and the use of hot water in the building will keep the cooling water circulating through the pressure vessel 42.

Operation

The cycle of operation begins when the temperature in the room 16 exceeds the boiling point of the refrigerant. If the refrigerant is selected and pressurized in the system such that boiling will occur in the 70° F.–75° F. range then the cycle of operation will begin in this temperature range. The heat in the room is absorbed by the refrigerant in the evaporator 14 and some of the refrigerant is transformed from a liquid to a vapor. The heated refrigerant and vapor flows as indicated by arrows 24, 26, and 28 from the evaporator 14 to the expansion chamber 32 of the thermal pump 18. In the expansion chamber some of the refrigerant that has been vaporized will be attracted by the greater volume of the liquid refrigerant and will flash back into liquid. Since expansion chamber 32 is in communication with standpipe 30 the heated refrigerant and any vapor which condenses in the expansion chamber 32 flows from the expansion chamber and collects at the top portion of standpipe 30. Consequently the relative liquid levels between standpipe 30 and the standpipe 34 varies with the level in standpipe 30 being higher. This difference in liquid level induces a flow down standpipe 30 as indicated by arrows 50, 51, 52, 53, 54, and 55 and up standpipe 34 as indicated by arrows 56, 57, and 58. My prior cited patent fully describes the heat flow in thermal pump apparatus of this nature.

The temperature of the refrigerant flowing down standpipe 30 will be at a temperature close to boiling point of the refrigerant or around 70° F.–75° F. The temperature of the groundwater which is located in the casement 40, on the other hand, will be in the 45° F.–55° F. range. This temperature difference causes heat to flow by condution and convection from the heated refrigerant in the standpipes and also from the standpipes into the groundwater where the heat is dissipated.

The cooled refrigerant then flows up standpipe 34 and back through the evaporator 14 where the cycle is repeated. The boiling of the refrigerant in the evaporator causes the air in room 16 to circulate an indicated by arrows 60, 62, and 64 with the air around the evaporator 14 being continuously cooled by the evaporator 14 and continuously displaced by the warmer air near the lower end of the room.

No valves or controls are required to maintain the flow of refrigerant in the system which will occur whenever the temperature in the room exceeds the pre-selected boiling point of the refrigerant. In addition, no energy input other than the heat from the air is required to produce the refrigeration.

If desired the evaporator 14 may be encased in a large section of tubing and a damper used to control the air flow around the evaporator 14. This arrangement would enable the air flow to be adjusted for varying the cooling output of the system.

As previously stated the system must be charged with the refrigerant at a pressure such that boiling will occur at the desired room temperature and some of the liquid in the evaporator will be transformed into vapor. For charging the system a fill plug 70 is provided near the top of the thermal pump 18. An inert gas can first be injected through the fill plug 70 to provide a certain pressure within the piping. The refrigerant can then be added to approximately the cold liquid fill level 21 and the inert gas can be bled off to the desired operating pressure.

Although the present invention has been described in terms of a particular embodiment, providng refrigeration for air conditioning, the system could also be used in other refrigeration applications and it is anticipated that various changes, adaptations and modifications will be apparent to those skilled in the art, and that it is intended that the appended claims be construed to cover such changes, adaptations, and modifications except at limited by the prior art.

What is claimed is:

1. Refrigeration apparatus for transferring heat from a space to be cooled to a cooler medium comprising:
    evaporator means adapted to contain a refrigerant for collecting heat from the space to be cooled for heating the refrigerant and transforming part of the refrigerant from a liquid to a vapor;
    an expansion chamber in communication with the evaporator means adapted for receiving the heated refrigerant and vapor from the refrigerant for condensing the vapor back to a liquid;
    a first standpipe adapted to contain the refrigerant and in communication with the expansion chamber;
    a second standpipe adapted to contain the refrigerant and in thermal conductive relationship with the first standpipe and in communication at one end with the evaporator means and at the opposite end with the first standpipe such that the refrigerant may circulate through the evaporator means and standpipes; and
    a perforated casing submerged in subterranean ground water for circulating cooling ground water around the standpipes which extend into the ground water for cooling the refrigerant.

2. Refrigeration apparatus as defined in claim 1 and further comprising a pressure vessel adapted to circulate water from a water main around the standpipe for cooling the refrigerant.

3. Refrigeration apparatus for transferring heat from a space to be cooled to a cooler medium comprising:
    evaporator means adapted to contain a refrigerant for collecting heat from the space to be cooled for heating the refrigerant and transforming part of the refrigerant from a liquid to a vapor;
    an expansion chamber in communication with the evaporator means adapted to receive the heated refrigerant and refrigerant vapor;
    a first standpipe adapted to contain the refrigerant with its upper end at an elevated location and its lower end at a lower location and in communication with the expansion chamber near its upper end;
    a second standpipe adapted to contain the refrigerant and in thermal conductive relationship with the first standpipe, and in communication at one end with the evaporator means and at the opposite end with the first standpipe at the first standpipe's lower end, such that the refrigerant heated in the evaporator means may circulate into the expansion chamber down the first standpipe and up the second standpipe back into the evaporator means; and
    means for circulating cooling water around the standpipes at their lower ends for cooling the refrigerant.

4. Refrigeration apparatus as defined in claim 3 and wherein the standpipes extend from above the level of the evaporator means down to the level of a water table beneath the space to be cooled and cooling ground water is circulated around the standpipes at their lower end for cooling the refrigerant.

5. Refrigeration apparatus as defined in claim 3 and wherein a pressure vessel is adapted to circulate cooling water from a water main around the standpipes for cooling the refrigerant.

* * * * *